(12) United States Patent
Fujisawa et al.

(10) Patent No.: US 8,340,182 B2
(45) Date of Patent: *Dec. 25, 2012

(54) VIDEO DECODING APPARATUS AND VIDEO DECODING METHOD

(75) Inventors: Tatsuro Fujisawa, Ome (JP); Yoshihiro Kikuchi, Ome (JP); Yuji Kawashima, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1369 days.

This patent is subject to a terminal disclaimer.

(21) Appl. No.: 11/645,570

(22) Filed: Dec. 27, 2006

(65) Prior Publication Data

US 2007/0160129 A1 Jul. 12, 2007

(30) Foreign Application Priority Data

Jan. 10, 2006 (JP) ................................. 2006-002974

(51) Int. Cl.
*H04N 7/32* (2006.01)
(52) U.S. Cl. .......... 375/240.13; 375/240.26; 375/240.29
(58) Field of Classification Search ............. 375/240.29, 375/240.13, 240.26
See application file for complete search history.

(56) References Cited

U.S. PATENT DOCUMENTS

| 6,907,079 | B2 | 6/2005 | Gomila et al. | |
|---|---|---|---|---|
| 2002/0118756 | A1* | 8/2002 | Nakamura et al. | 375/240.17 |
| 2003/0206587 | A1 | 11/2003 | Gomila | |
| 2004/0184549 | A1* | 9/2004 | Webb | 375/240.29 |
| 2004/0240549 | A1* | 12/2004 | Cote et al. | 375/240.15 |
| 2006/0126725 | A1* | 6/2006 | Zeng et al. | 375/240.03 |
| 2007/0160140 | A1* | 7/2007 | Fujisawa et al. | 375/240.12 |

FOREIGN PATENT DOCUMENTS

| JP | 2001-275110 | 10/2001 |
|---|---|---|
| JP | 2003-179921 | 6/2003 |
| JP | 2003-304538 | 10/2003 |

OTHER PUBLICATIONS

U.S. Appl. No. 11/711,024, filed Feb. 27, 2007 (38 pages).
Response filed in U.S. Appl. No. 11/711,024 on Oct. 18, 2011 (9 pages).
ITU-T Recommendation H.264 (2003), "Advanced Video Coding for Generic Audiovisual Services," Mar. 2005.
ISO/IEC 14496-10: 2003, "Information Technology, Coding of Audio-Visual Objects—Part 10: Advanced Video Coding."
H.264/AVC Textbook (Impress Communications Corporation), 2004.
Notice of Reasons for Rejection for Application No. 2006-002974, the Japanese Patent Office, mailed Jun. 1, 2010.

* cited by examiner

*Primary Examiner* — Sath V Perungavoor
*Assistant Examiner* — Jeffery Williams
(74) *Attorney, Agent, or Firm* — Finnegan, Henderson, Farabow, Garrett & Dunner, L.L.P.

(57) ABSTRACT

According to one embodiment, a video decoding apparatus decoding a video stream selectively generates one of an intra prediction image and an inter prediction image based on an encoding mode of a decoding object from the video stream and decoded images thereof, generates a residual decoded image based on a quantization parameter of a decoding object from the video stream, generates a decoded image by adding an intra prediction image and an inter prediction image selectively generated, and the residual decoded image, applies deblocking filter process for reducing a block distortion onto the decoded image, extracting at least one of information on a quantization parameter and information on an encoding mode of a decoding object from the video stream, and determining whether or not the filter process is skipped based on extracted information thereof, and selectively skipping the filter process based on a result of the determination.

14 Claims, 13 Drawing Sheets

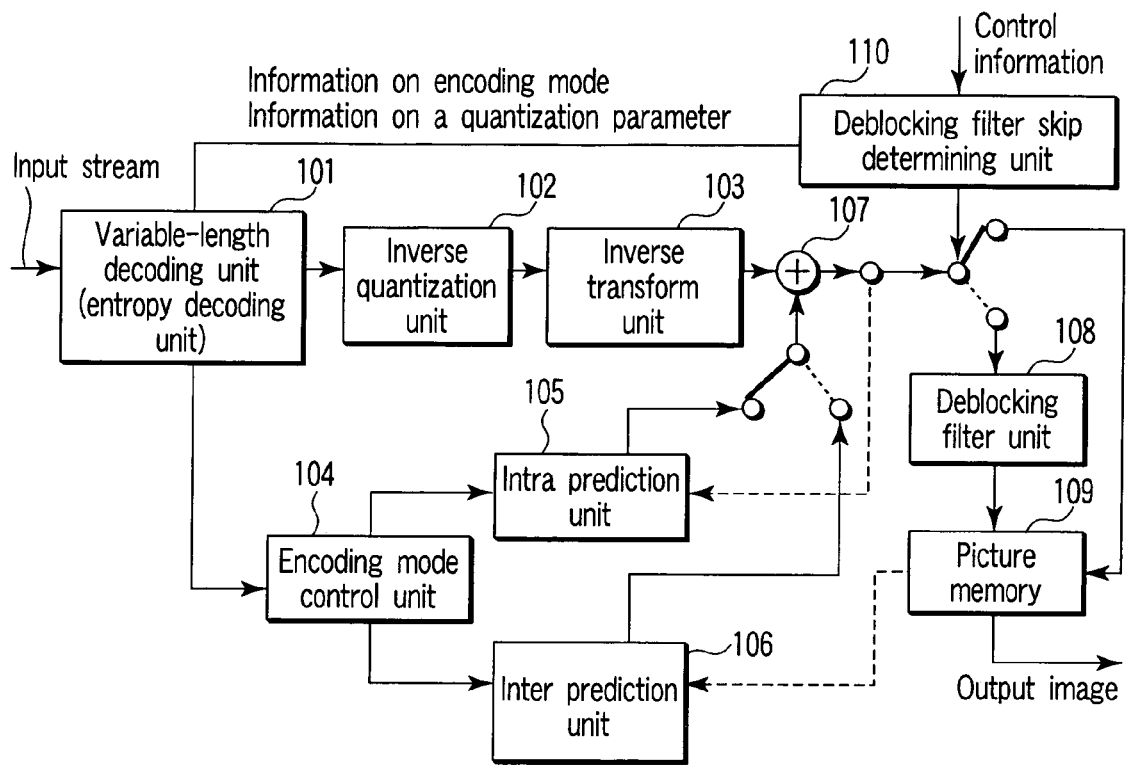
F I G. 1
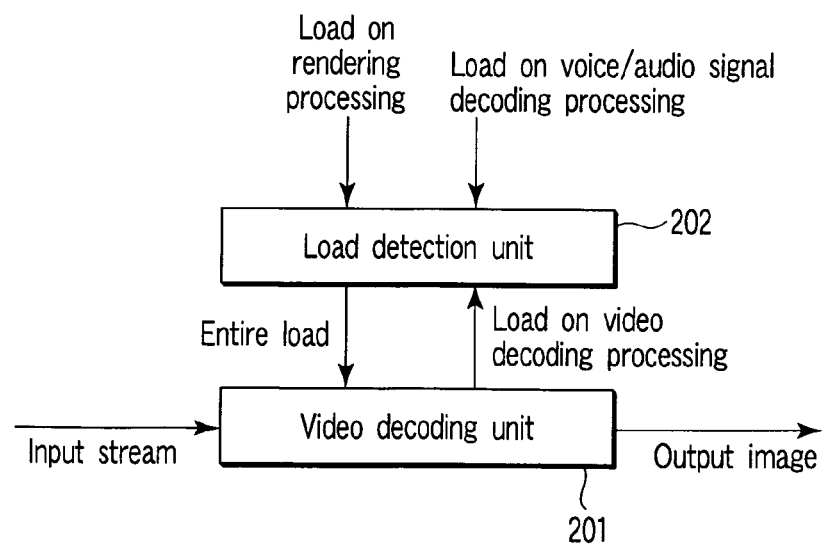
F I G. 2

VIDEO DECODING APPARATUS AND VIDEO DECODING METHOD

CROSS-REFERENCE TO RELATED APPLICATIONS

This application is based upon and claims the benefit of priority from Japanese Patent Application No. 2006-002974, field Jan. 10, 2006, the entire contents of which are incorporated herein by reference.

BACKGROUND

1. Field

One embodiment of the invention relates to a video decoding apparatus and a video decoding method which decodes a video stream which has been compressed and encoded.

2. Description of the Related Art

As standard technologies for encoding a video stream, H.261 and H.263 of the International Telecommunication Union Telecommunication Standardization Sector (ITU-T), Moving Picture Experts Group (MPEG)-1, MPEG-2, and MPEG-4 of the International Organization for Standardization (ISO), and the like, have been developed. As a next-generation video encoding method in which the technologies such as H.261 to H.263, MPEG-1 to MPEG-4, and the like have been succeeded, and further developed, there is the H.264 which has been standardized by the ISO and the ITU jointly. In the H.264, a deblocking filter for relieving a distortion generated at a block boundary is used as one of filters in loop, which enhances a picture quality improvement effect at a low bit rate particularly (refer to ITU-T Recommendation H.264 (2003), "Advanced Video Coding for generic audiovisual services"|ISO/IEC 14496-10: 2003, "Information technology, Coding of audio-visual objects—Part 10: Advanced video coding", and H.264/AVC textbook (Impress Communications Corporation)).

However, in a video decoding apparatus in accordance with standardization specifications based on the H.264, a proportion of the throughput of the deblocking filter accounting the entire decoding processing is practically high. Therefore, real-time decoding processing is made unable to be in time in a case of a system with low processing capacity, or when a load on the processing of an entire system is high, and there is possibility that defects in which frames are dropped, movement of an object is made extremely slow, and the like, are brought about.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing a structural example when the present invention is applied to a video decoding apparatus in accordance with standardization specifications based on the H.264, as one embodiment of a video decoding apparatus according to the present embodiment;

FIG. 2 is a block diagram showing a structural example of a content information processing system including the video decoding apparatus shown in FIG. 1 as a video decoding unit;

DETAILED DESCRIPTION

Figure 3:
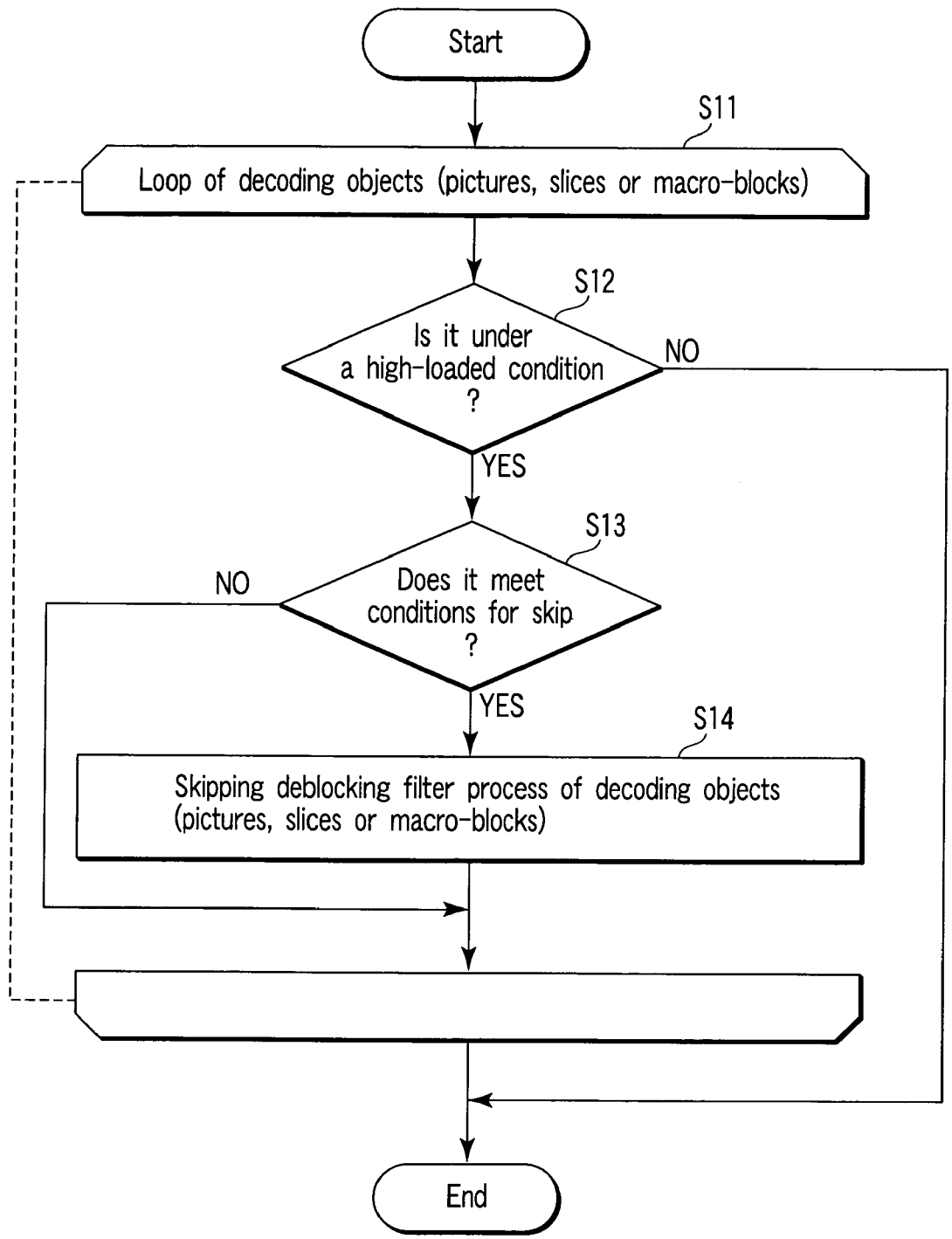
FIG. 3 is a flowchart showing a basic processing example of a deblocking filter skip determining unit in FIG. 1.

Various embodiments according to the invention will be described hereinafter with reference to the accompanying drawings. In general, according to one embodiment of the invention, a video decoding apparatus decoding a video stream which has been compressed and encoded, comprising: a prediction decoding unit which selectively generates one of an intra prediction image and an inter prediction image based on an encoding mode of a decoding object from the video stream and decoded images thereof; a residual decoding unit which generates a residual decoded image based on a quantization parameter of a decoding object from the video stream; an adding unit which generates a decoded image by adding an intra prediction image and an inter prediction image selectively generated by the prediction decoding unit, and a residual decoded image generated by the residual decoding unit; a filter process unit which applies deblocking filter process for reducing a block distortion onto a decoded image generated by the adding unit; a determining unit which extracts at least one of information on a quantization parameter and information on an encoding mode of a decoding object from the video stream, and which determines whether or not the filter process is skipped, based on extracted information thereof; and a skip processing unit which selectively omits the filter process based on a determined result of the determining unit.

Hereinafter, embodiments of the present invention will be described with reference to the drawings.

FIG. 1 is a block diagram showing a structural example when the present invention is applied to a video decoding apparatus in accordance with standardization specifications based on the H.264, as one embodiment of a video decoding apparatus relating to the present invention. In FIG. 1, an input stream is a video stream which has been compressed and encoded in accordance with the H.264 standard, and is transmitted to a variable-length decoding unit (called an entropy decoding unit as well) 101. The variable-length decoding unit 101 encodes an input stream so as to be a varying length, and generates syntax. An inverse quantization unit 102 and an inverse transform unit 103 generate a residual image from a result of encoding of a video encoded stream based on the generated syntax.

An encoding mode control unit 104 discriminates an encoding mode based on the input stream from the variable-length decoding unit 101, and selectively controls to drive a intra prediction unit 105 and a inter prediction unit 106 based on a result of discrimination. The intra prediction unit 105 and the inter prediction unit 106 respectively generate predicted images in a screen and between screens in accordance with an encoding mode designated by the encoding mode control unit 104. Generated predicted images are selectively transmitted to a residual adding unit 107. The residual adding unit 107 adds a predicted image from the intra prediction unit 105 or the inter prediction unit 106, and a residual image from the inverse transform unit 103 to generate a decoded image. The generated decoded image is provided as a reference in the intra prediction unit 105.

Further, a deblocking filter skip determining unit 110 extracts information on a quantization parameter such as a quantization step or the like, and information on an encoding mode from the variable-length decoding unit 101, and determines whether or not deblocking filter process is carried out onto the generated decoded image generated in the residual adding unit 107. The determining method will be described later. Here, in a case in which deblocking filter process is carried out, the decoded image is inputted to a deblocking filter unit 108, and a reconstructed image is prepared by carrying out filter process, and is stored in a picture memory 109. When deblocking filter process is not carried out, the decoded image is directly stored as a reconstructed image in the picture memory 109. The reconstructed image stored in the picture memory 109 is outputted as an output image and provided as a reference in the inter prediction unit 106.

There is a feature of the present invention in the point that, when a throughput is reduced by skipping a deblocking filter having high processing load, in consideration of deterioration in picture quality, an attempt is made to reduce a throughput while preventing deterioration in picture quality as much as possible by skipping only portions predicted with less deterioration in picture quality. To describe concretely, in order to prevent deterioration in picture quality, (1) Only portions on which a filter effect is weak are skipped (portions on which a filter effect is strong are not skipped), and (2) Portions from which errors run through the following portions are not skipped (only independent portions are skipped) are principles.

In skip determination of a deblocking filter, information on a quantization parameter and information on an encoding mode obtained from an input stream by the variable-length decoding unit 101 are utilized. In a deblocking filter, there are features that the larger the quantization parameter is, the easier the filtering is, and the larger the information on an encoding mode (Bs value) is, the easier the filtering is. In the present invention, skip of filter process is effectively carried out by utilizing these features.

Here, a quantization parameter is a degree of quantizing an orthogonal transformation coefficient (DCT coefficient) in a macro-block, and when this value is too large, a noise called a block-noise is generated. In accordance with ease of generating of a block-noise, i.e., as a quantization parameter is made larger, a filter effect is made stronger. As quantization parameters in the H.264 standard, a quantization parameter of a slice and a quantization parameter of a macro-block are stipulated.

(Skip Determination by Information on a Quantization Parameter)

When skip determination is carried out by information on a quantization parameter, a central value of quantization parameters and a predetermined threshold value are compared. The deblocking filter is skipped when the following relation is satisfied:

the central value of quantization parameters<the threshold value.

As the central value of quantization parameters, there are the following five patterns.

Pattern 1: A skip range of filter process is made to be in units of pictures, and a central value is regarded as an average value of quantization parameters of slices belonging to a reference picture.

Pattern 2: A skip range of filter process is made to be in units of pictures, and a central value is regarded as an average value of quantization parameters of macro-blocks belonging to a reference picture.

Pattern 3: A skip range of filter process is made to be in units of slices, and a central value is regarded as a quantization parameter of a reference slice.

Pattern 4: A skip range of filter process is made to be in units of slices, and a central value is regarded as an average value of quantization parameters of macro-blocks belonging to a reference slice.

Pattern 5: A skip range of filter process is made to be in units of macro-blocks, and a central value is regarded as a quantization parameter of a reference macro-block.

As the threshold value, three are the following three types.

(1) A constant (which is a fixed value, or is set based on an extent of a loaded condition)

(2) An average value of central values in past (decoded) pictures or slices (3) A value in which an offset value (a constant) is added to an average value of central values in past (decoded) pictures or slices (Skip Determination by Information on an Encoding Mode)

Next, first to fourth methods in a case in which skip determination is carried out by information on an encoding mode will be described.

In the first method by an encoding mode, when decoding objects are slices in I picture (hereinafter, I slices), deblocking filter process is not skipped. This is because a filter effect is strong in an intra-predicted macro-block, and deterioration in picture quality due to skip is made large. In this method, there are the following two patterns.

Pattern 1: A skip range of filter process is made to be in units of slices, and when a reference slice is an I slice, filter process is not skipped.

Pattern 2: A skip range of filter process is made to be in units of pictures, and when a number or a ratio of I slices belonging to a reference picture is larger than a threshold value, filter process is not skipped. As a threshold value, a constant (which is a fixed value, or is set based on an extent of a loaded condition), or an average value of a number (or a ratio) of I slices in past pictures (or a value in which an offset value (a constant) is added to an average value) is utilized.

In the second method by an encoding mode, when decoding objects are intra-predicted macro-blocks, deblocking filter process is not skipped. As described above, this is because a filter effect in an intra-predicted macro-block is strong, and deterioration in picture quality due to skip is made large. In this method, there are the following three patterns.

Pattern 1: A skip range of filter process is made to be in units of macro-blocks, and when a reference macro-block is an intra-predicted macro-block, filter process is not skipped.

Pattern 2: A skip range of filter process is made to be in units of slices, and when a number of intra-predicted macro-blocks belonging to a reference slice is larger than a threshold value, filter process is not skipped. As a threshold value, a constant (which is a fixed value, or is set based on an extent of a loaded condition), or an average value of a number (or a ratio) of intra-predicted macro-blocks belonging to past (decoded) slices (or a value in which an offset value (a constant) is added to an average value) is utilized.

Pattern 3: A skip range of filter process is made to be in units of pictures, and when a number of intra-predicted macro-blocks belonging to a reference picture is larger than a threshold value, filter process is not skipped. As a threshold value, a constant (which is a fixed value, or is set based on an extent of a loaded condition), or an average value of a number (or a ratio) of intra-predicted macro-blocks belonging to past (decoded) pictures (or a value in which an offset value (a constant) is added to an average value) is utilized.

In the third method by an encoding mode, when decoding objects are slices in B picture (hereinafter, B slices), deblocking filter process is skipped. The reason for this is that, because pictures are not referred in B slices, deterioration in picture quality does not extend to the following pictures, and because a throughput is high, an effect of skip is large. In this method, there are the following two patterns.

Pattern 1: A skip range of filter process is made to be in units of slices, and when a reference slice is a B slice, filter process is skipped.

Pattern 2: A skip range of filter process is made to be in units of pictures, and when a number of B slices belonging to a reference picture is larger than a threshold value, filter process is skipped. As a threshold value, a constant (which is a fixed value, or is set based on an extent of a loaded condition), or an average value of a number (or a ratio) of B slices belonging to past (encoded) pictures (or a value in which an offset value (a constant) is added to an average value) is utilized.

In the fourth method by an encoding mode, when decoding objects are bi-directional predicted macro-blocks of a B picture (hereinafter, bi-directional predicted (B) macro-blocks), because pictures are not referred, and a throughput is large, filter process is skipped. In this method, there are the following three patterns.

Pattern 1: A skip range of filter process is made to be in units of macro-blocks, and when a reference macro-block is a bi-directional predicted (B) macro-block, filter process is skipped.

Pattern 2: A skip range of filter process is made to be in units of slices, and when a number of bi-directional predicted (B) macro-blocks belonging to a reference slice is larger than a threshold value, filter process is skipped. As a threshold value, a constant (which is a fixed value, or is set based on an extent of a loaded condition), or an average value of a number (or a ratio) of bi-directional predicted (B) macro-blocks belonging to past (decoded) slices (or a value in which an offset value (a constant) is added to an average value) is utilized.

Pattern 3: A skip range of filter process is made to be in units of pictures, and when a number of bi-directional predicted (B) macro-blocks belonging to a reference picture is larger than a threshold value, filter process is skipped. As a threshold value, a constant (which is a fixed value, or is set based on an extent of a loaded condition), or an average value of a number (or a ratio) of bi-directional predicted (B) macro-blocks belonging to past (decoded) pictures (or a value in which an offset value (a constant) is added to an average value) is utilized.

In accordance with the above-described processing for skip determination of deblocking filter process, it is possible to reduce a throughput while preventing picture quality from being largely deteriorated. Moreover, because there are a very small number of changes in a conventional structure, structure of the present invention can be easily built in.

In the above-described video decoding methods, as compared with the conventional method, an amount of throughput in the processing for determination carried out in the deblocking filter skip determining unit 110 is increased. However, because this is considered to be an extremely small amount for the entire deblocking filter process which can be skipped, it will be possible to largely reduce a throughput as a whole.

FIG. 2 shows a structural example of a content information processing system including the video decoding apparatus shown in FIG. 1 as a video decoding unit 201. This system further includes a load detection unit 202. The load detection unit 202 acquires information on processing load in video decoding processing from the video decoding unit 201 and information on the other processing load of the system in decoding processing for voice/audio signals, rendering processing, and the like. The load detection unit 202 calculates an entire load based on the input information on load and notifies the video decoding unit 201 of the information on load.

Figure 4:
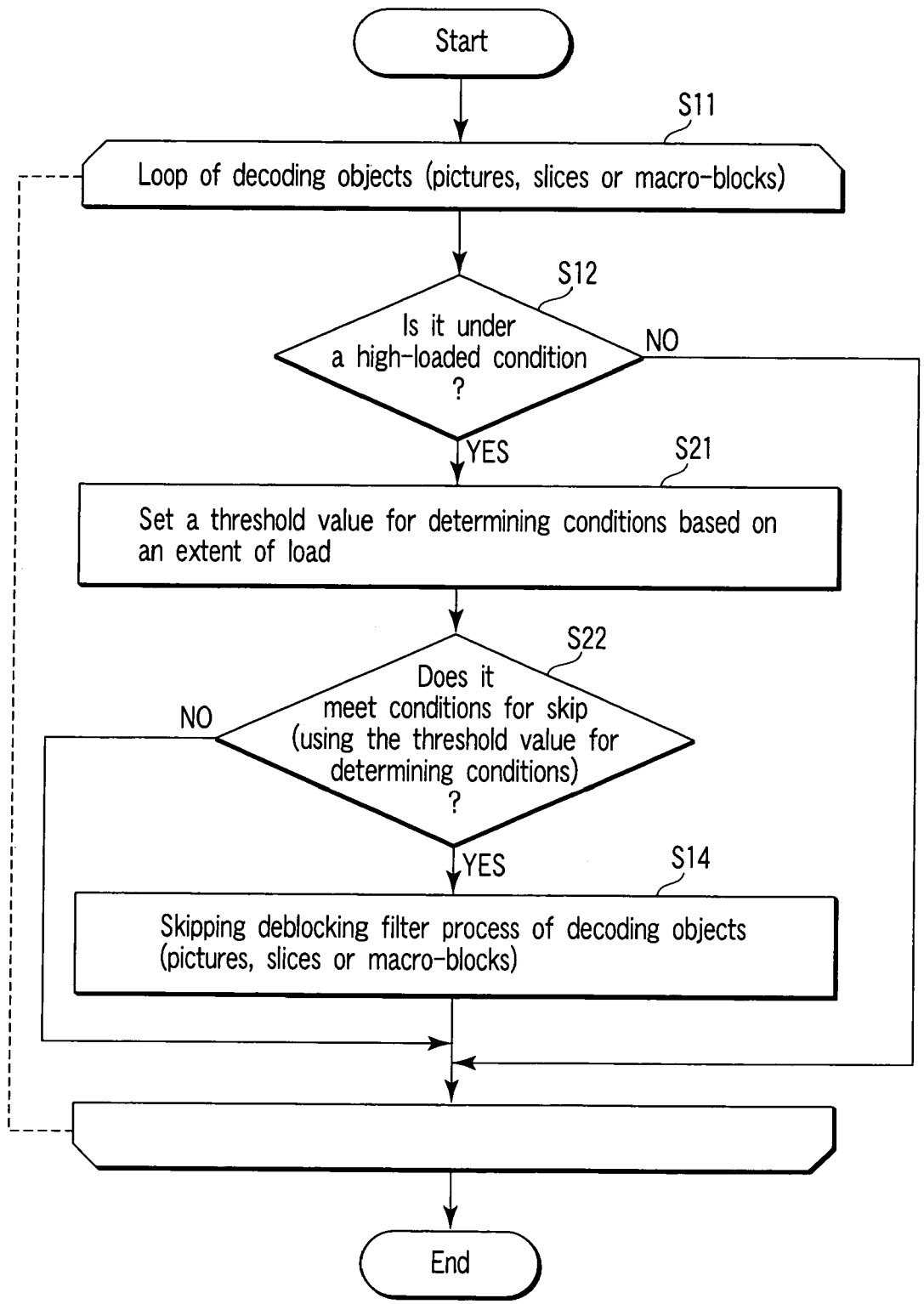
FIG. 4 is a flowchart showing another basic processing example of the deblocking filter skip determining unit in FIG. 1.

The information on load is inputted to the deblocking filter skip determining unit 110 in FIG. 1, in the video decoding unit 201. Basic processing examples of the determining unit 110 are shown in FIG. 3 and FIG. 4. Note that, in FIG. 4, steps which are the same as those in FIG. 3 are denoted by the same reference numerals.

In the processing example shown in FIG. 3, when a start of skip determination is instructed in decoding processing, a skip range of filter process is set to be a loop in units of pictures, slices, or macro-blocks (step S11), and it is determined whether or not the processing is under a high-loaded condition (step S12). When it is determined that the processing is under a high-loaded condition, it is determined whether or not the skip range meets the conditions for skip according to the aforementioned methods based on information on an encoding mode and a quantization parameter of an decoding object (step S13). When it meets the conditions, processing is skipped deblocking filter process of the decoding object (step S14). When it is determined that it does not meet the conditions for skip at step S13, the processing at step S14 is passed, and the routine proceeds to processing for the following decoding object. Further, when it is determined that the processing is not under a high-loaded condition at step S12, because it is possible to execute deblocking filter process in real time, the processing for skip determination is terminated, and deblocking filter process is executed.

In contrast thereto, in the processing example shown in FIG. 4, when it is determined that the processing is under a high-loaded condition at step S12 for determining a high-loaded condition, a threshold value for determining conditions is set based on an extent of load (step S21), and it is determined whether or not it meets the conditions for skip in the same way at the step S13 by using the threshold value (step S22).

Namely, in both of the procedures of the above-described two processing examples, by appropriately controlling filter process in accordance with a loaded condition for each decoding object, skip of deblocking filter process is not carried out when a load on an entire system is low or a system has a high processing capacity. Deblocking filter process is executed when decoding processing in real time is sufficiently possible. Therefore, it is possible to effectively skip filter process while preventing unnecessary deterioration in picture quality.

Hereinafter, some of methods for skip determination of the deblocking filter skip determining unit 110 will be described by sampling an embodiment for each condition for skip.

First Embodiment

Figure 5:
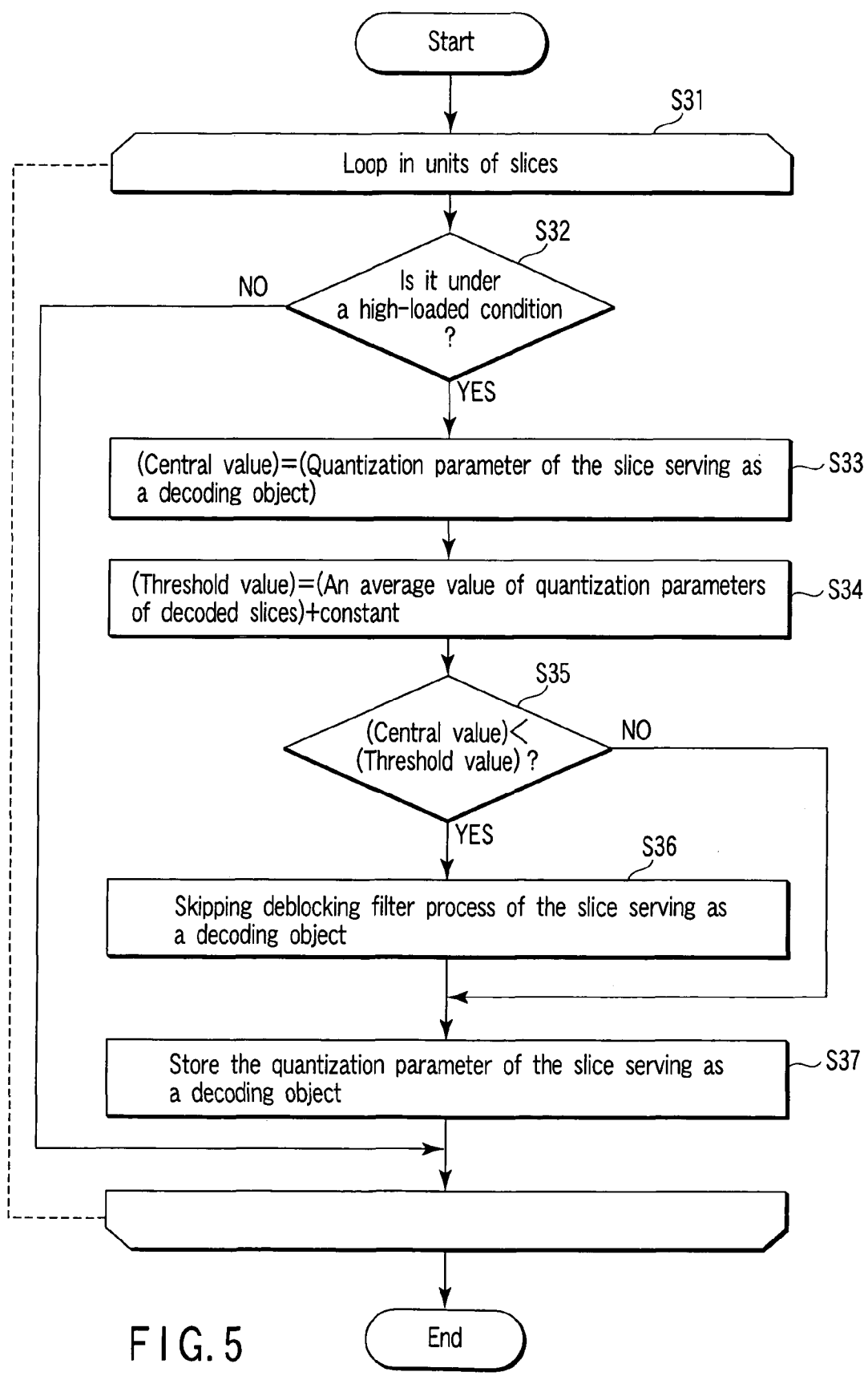
FIG. 5 is a flowchart showing a processing example in a case according to pattern 3 in skip determination by information on a quantization parameter, as a first embodiment of a skip determining method of the deblocking filter skip determining unit in FIG. 1.

FIG. 5 is a flowchart showing a processing example in a case of the pattern 3 in skip determination by information on a quantization parameter described above, as a first embodiment. In this embodiment, a skip range of filter process is set to be a loop in units of slices (step S31). Next, it is determined whether or not the processing is under a high-loaded condition (step S32), and when the processing is under a high-loaded condition, a quantization parameter of a slice serving as a decoding object is set as a central value (step S33), and (an average value of quantization parameters of decoded slices)+a constant (an offset value) is set as a threshold value (step S34), and it is determined whether or not the central value is less than the threshold value (step S35). When the central value is less than the threshold value, processing is skipped deblocking filter process of the slice serving as a decoding object (step S36), and a quantization parameter of the slice serving as a decoding object is stored, and the routine proceeds to skip determination for the following slice unit (step S37). When it is determined that the central value is not less than the threshold value at the step S35, the processing at step S36 is skipped. Further, when it is determined that the processing is not under a high-loaded condition at the step S32, processing is carried out such that deblocking filter process is executed onto the slice serving as a decoding object.

Second Embodiment

Figure 6:
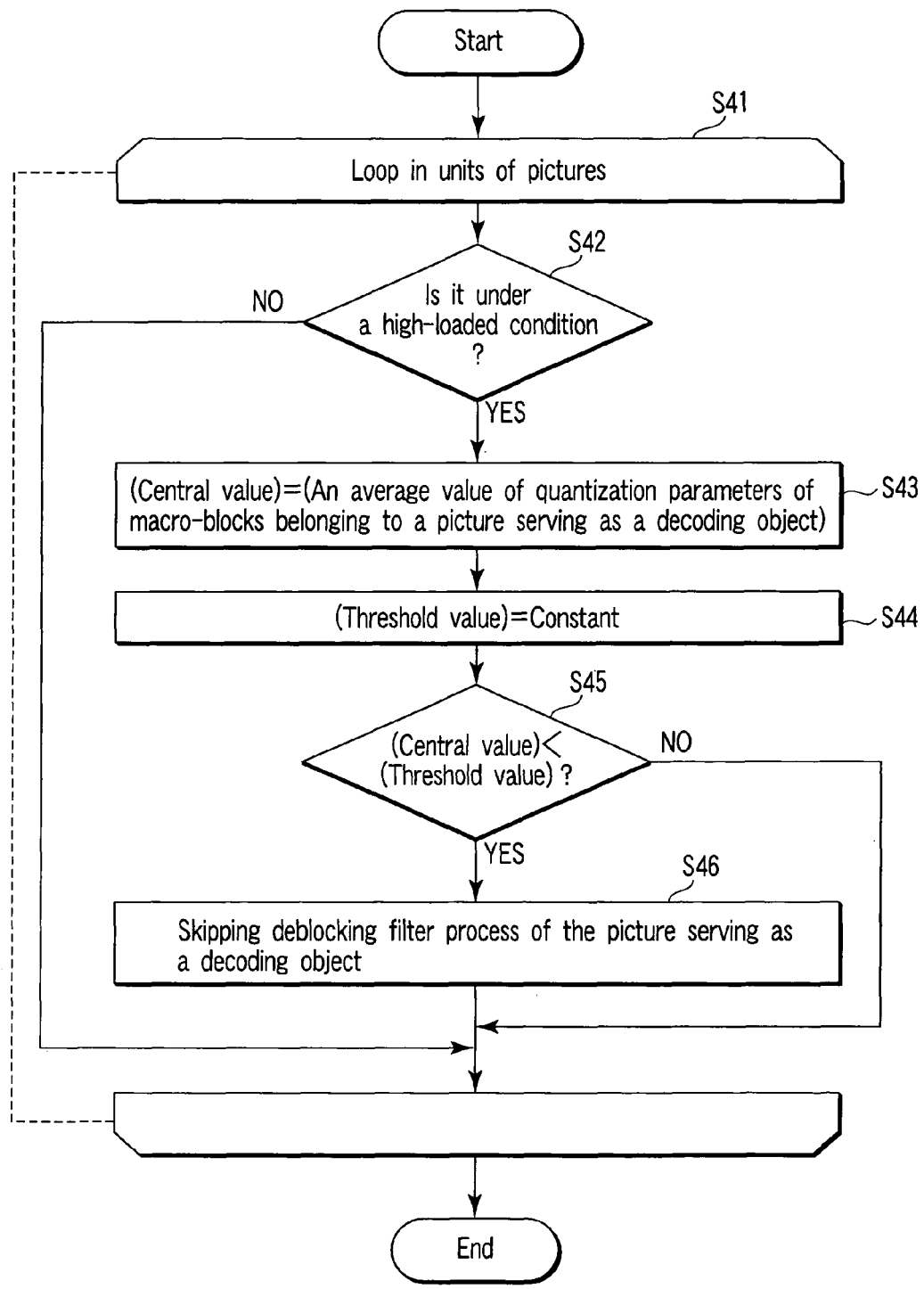
FIG. 6 is a flowchart showing a processing example in a case according to pattern 2 in skip determination by information on a quantization parameter, as a second embodiment of the skip determining method of the deblocking filter skip determining unit in FIG. 1.

FIG. 6 is a flowchart showing a processing example in a case of the pattern 2 in skip determination by information on a quantization parameter described above, as a second embodiment. In this embodiment, a skip range of filter process is set to be a loop in units of pictures (step S41). Next, it is determined whether or not the processing is under a high-loaded condition (step S42), and when the processing is under a high-loaded condition, (an average value of quantization parameters of macro-blocks belonging to a picture serving as a decoding object) is set as a central value (step S43), and a constant is set as a threshold value (step S44), and it is determined whether or not the central value is less than the threshold value (step S45). When the central value is less than the threshold value, processing is skipped deblocking filter process of the picture serving as a decoding object (step S46). When it is determined that the central value is not less than the threshold value at the step S45, the processing at step S46 is passed. Further, when it is determined that the processing is not under a high-loaded condition at the step S42, processing is carried out such that deblocking filter process is executed onto the picture serving as a decoding object.

Third Embodiment

Figure 7:
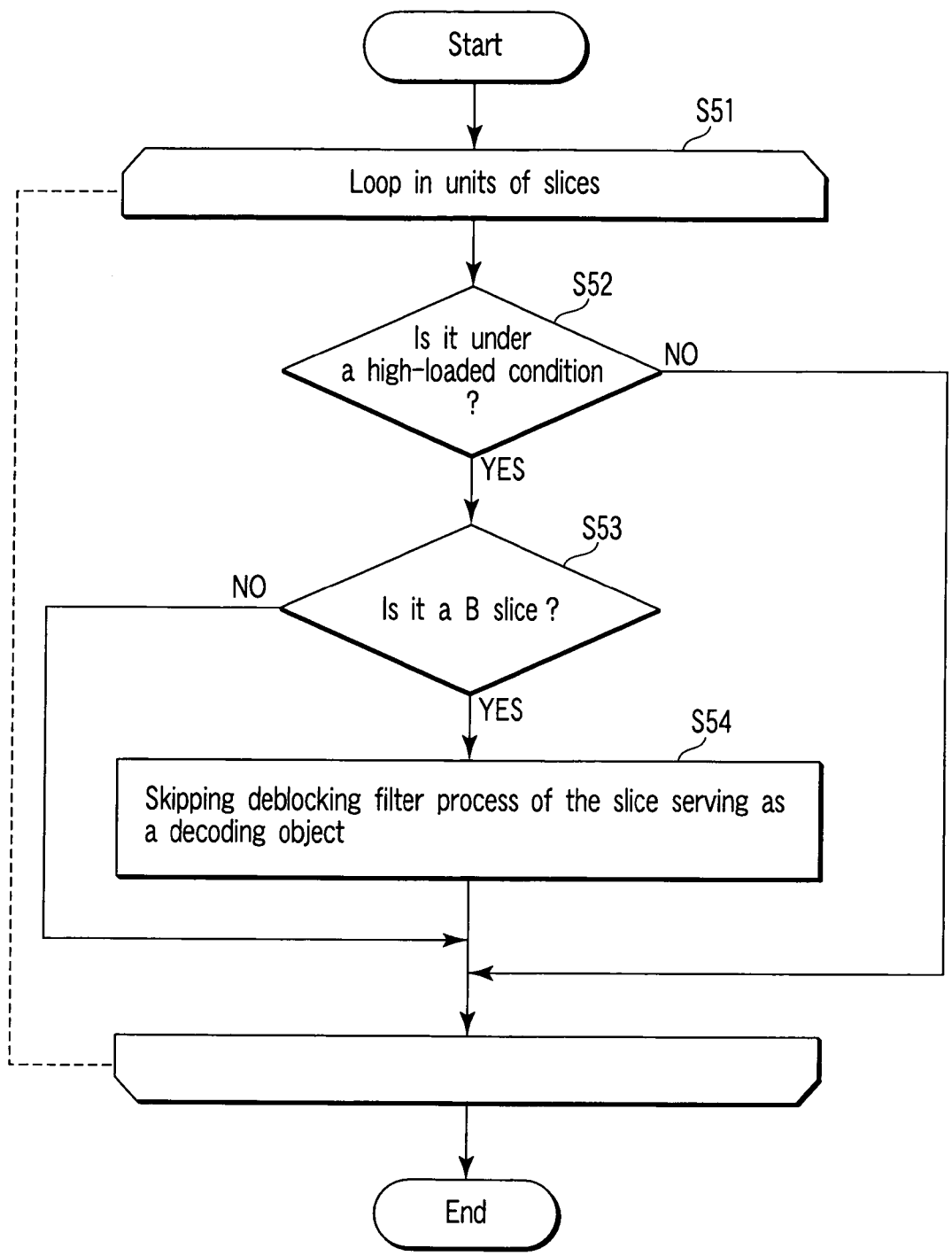
FIG. 7 is a flowchart showing a processing example in a case according to pattern 1 of a third method in skip determination by information on an encoding mode, as a third embodiment of the skip determining method of the deblocking filter skip determining unit in FIG. 1.

FIG. 7 is a flowchart showing a processing example in a case of the pattern 1 of the third method in skip determination by information on an encoding mode described above, as a third embodiment. In this embodiment, a skip range of filter process is set to be a loop in units of slices (step S51). Next, it is determined whether or not the processing is under a high-loaded condition (step S52), and when the processing is under a high-loaded condition, it is determined whether or nor an decoding object is a B slice (step S53), and when the decoding object is a B slice, processing is skipped deblocking filter process of the slice serving as a decoding object (step S54), and the routine proceeds to skip determination for the following slice unit. When it is determined that the decoding object is not a B slice at step S53, the processing at step S54 is passed. Further, when it is determined that the processing is not under a high-loaded condition at the step S52, processing is carried out such that deblocking filter process is executed onto the slice serving as a decoding object.

Fourth Embodiment

Figure 8:
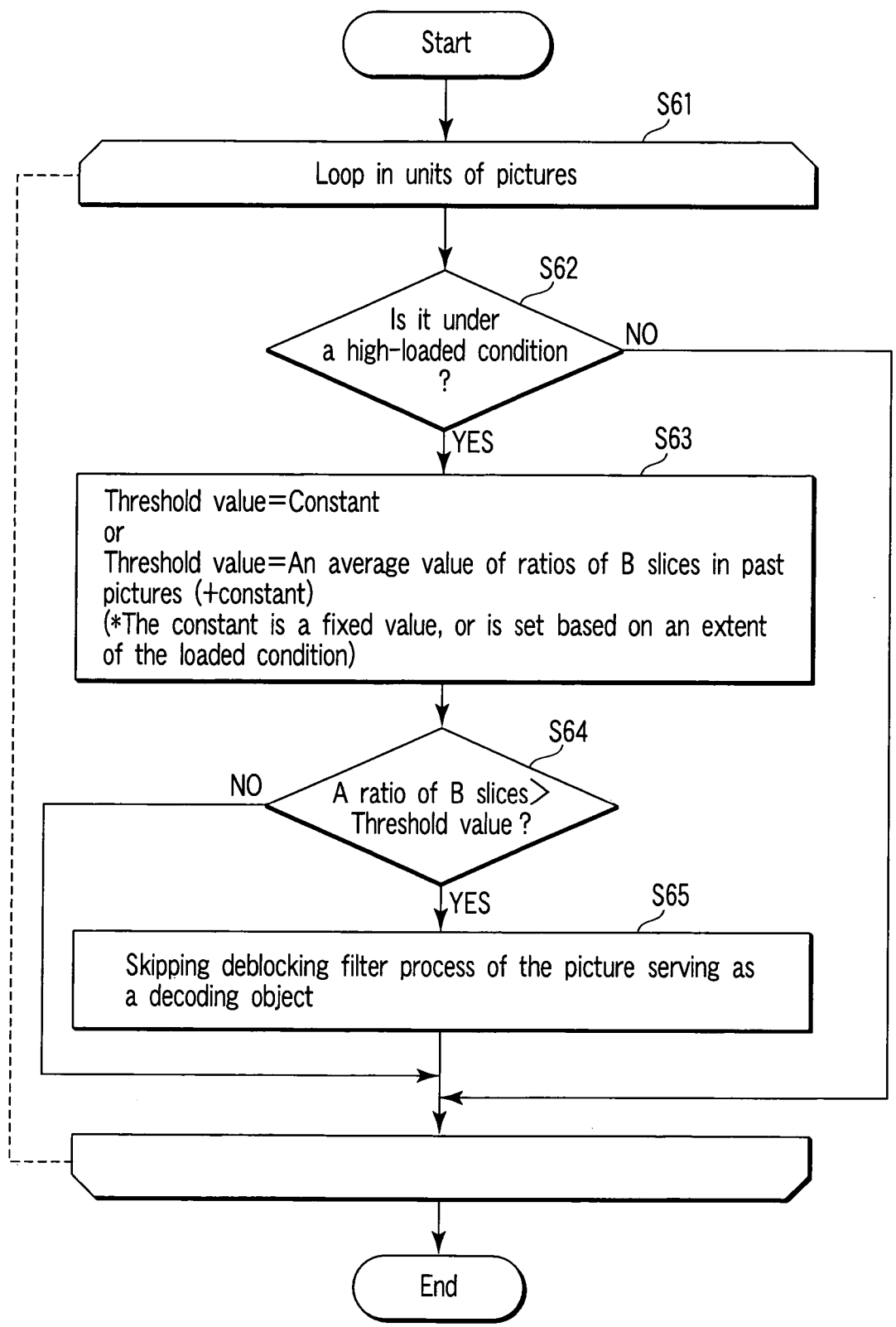
FIG. 8 is a flowchart showing a processing example in a case according to pattern 2 of the third method in skip determination by information on an encoding mode, as a fourth embodiment of the skip determining method of the deblocking filter skip determining unit in FIG. 1.

FIG. 8 is a flowchart showing a processing example in a case of the pattern 2 of the third method in skip determination by information on an encoding mode described above, as a fourth embodiment. In this embodiment, a skip range of filter process is set to be a loop in units of pictures (step S61). Next, it is determined whether or not the processing is under a high-loaded condition (step S62), and when the processing is under a high-loaded condition, a constant (which is a fixed value, or is set based on an extent of a loaded condition), or a value in which a constant is added to an average value of ratios of B slices in past (decoded) pictures is set as a threshold value (step S63), and it is determined whether or not a ratio of B slices in a picture serving as a decoding object is larger than a threshold value (step S64). When a ratio of B slices is larger than the threshold value, processing is skipped deblocking filter process of the picture serving as a decoding object (step S65), and the routine proceeds to skip determination for the following picture unit. When it is determined that a ratio of B slices is not larger than the threshold value at step S64, the processing at step S65 is passed. Further, when it is determined that the processing is not under a high-loaded condition at the step S62, processing is carried out such that deblocking filter process is executed onto the picture serving as a decoding object.

Fifth Embodiment

Figure 9:
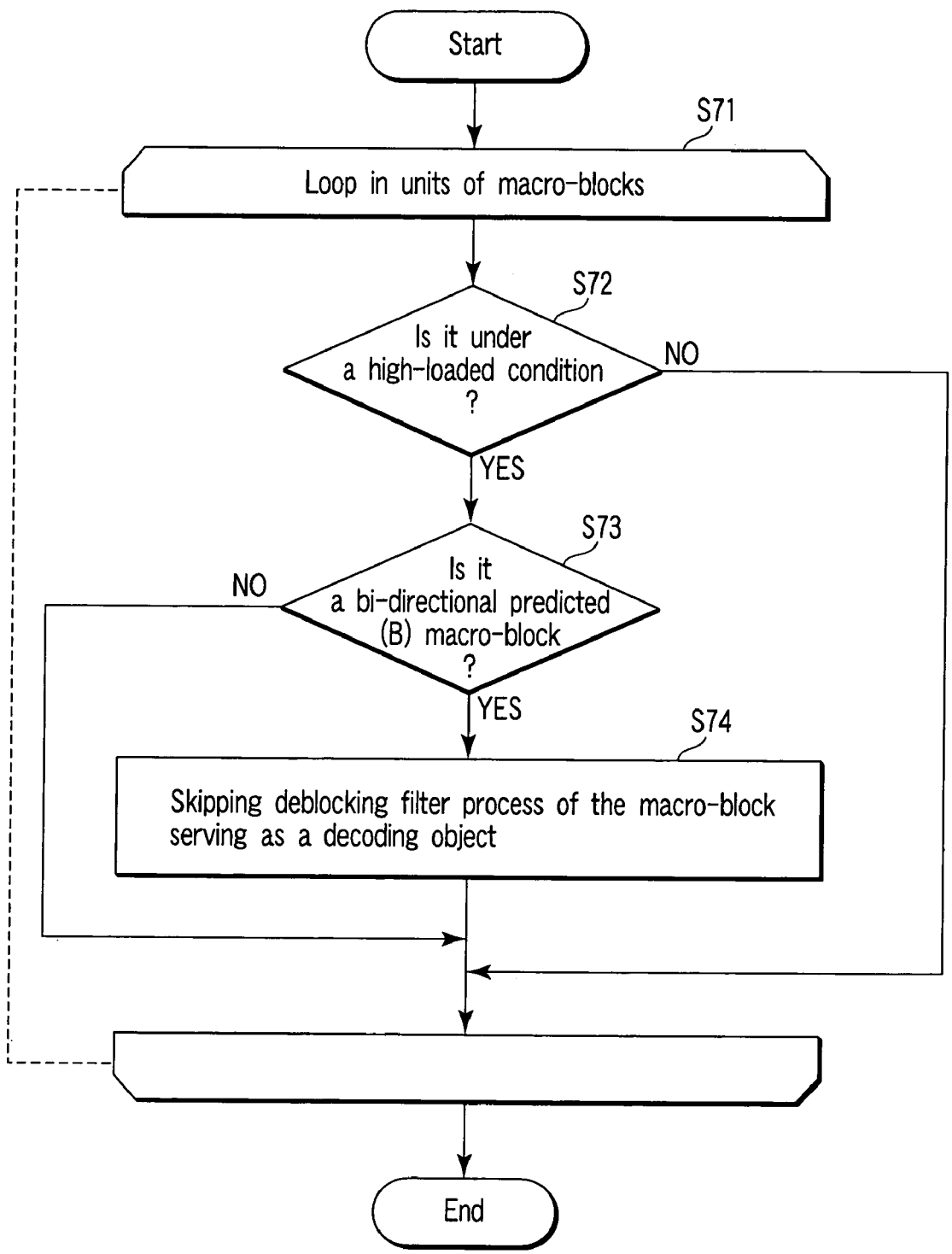
FIG. 9 is a flowchart showing a processing example in a case according to pattern 1 of a fourth method in skip determination by information on an encoding mode, as a fifth embodiment of the skip determining method of the deblocking filter skip determining unit in FIG. 1.

FIG. 9 is a flowchart showing a processing example in a case of the pattern 1 of the fourth method in skip determination by information on an encoding mode described above, as a fifth embodiment. In this embodiment, a skip range of filter process is set to be a loop in units of macro-blocks (step S71). Next, it is determined whether or not the processing is under a high-loaded condition (step S72), and when the processing is under a high-loaded condition, it is determined whether or not a decoding object is a bi-directional predicted (B) macro-block (step S73). When the decoding object is a bi-directional predicted (B) macro-block, processing is skipped deblocking filter process of the macro-block serving as a decoding object (step S74), and the routine proceeds to skip determination for the following macro-block unit. When it is determined that the decoding object is not a bi-directional predicted (B) macro-block at step S73, the processing at step S74 is passed. Further, when it is determined that the processing is not under a high-loaded condition at the step S72, processing is carried out such that deblocking filter process is executed onto the macro-block serving as a decoding object.

Sixth Embodiment

Figure 10:
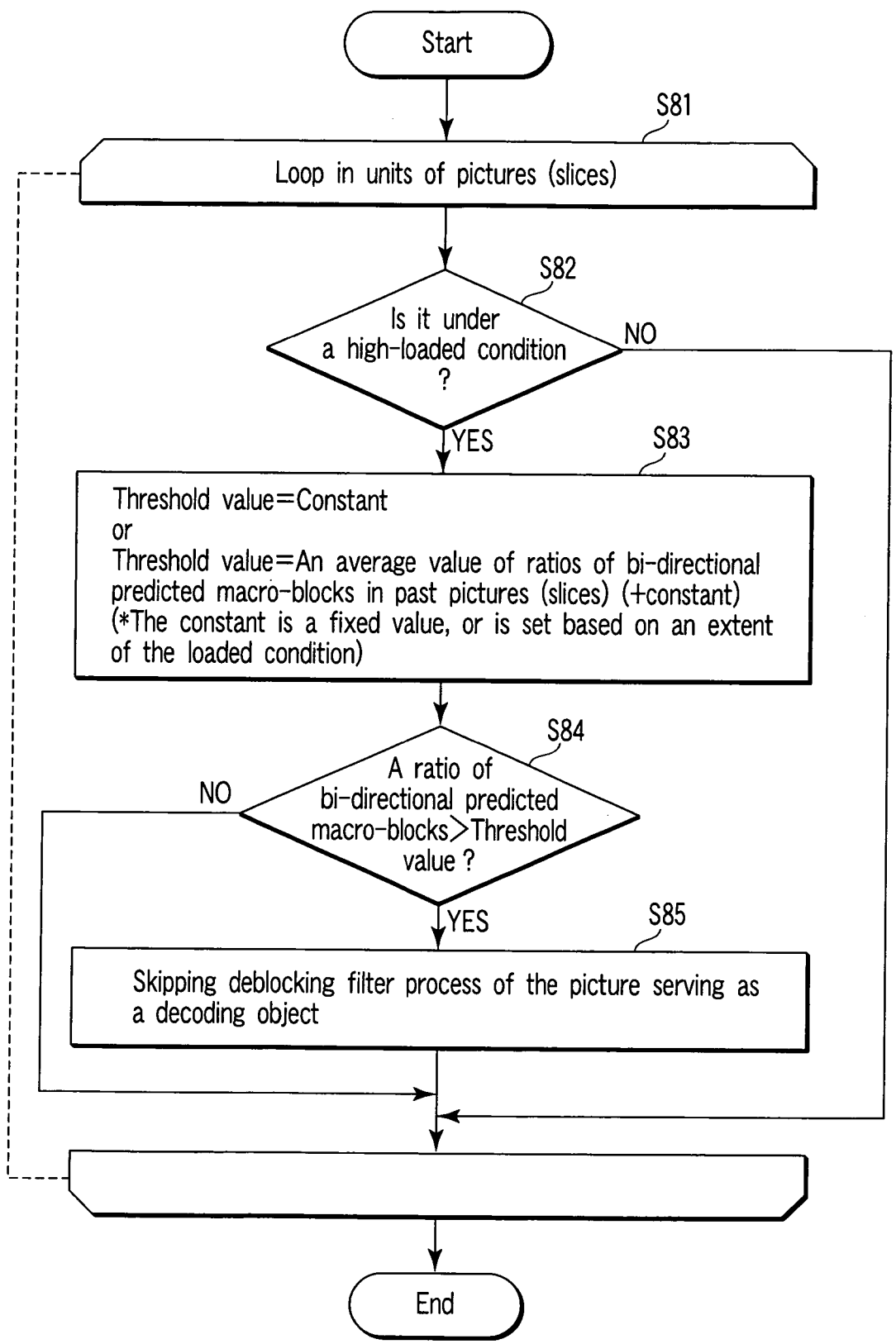
FIG. 10 is a flowchart showing a processing example in a case according to pattern 2 (or 3) of the fourth method in skip determination by information on an encoding mode, as a sixth embodiment of the skip determining method of the deblocking filter skip determining unit in FIG. 1.

FIG. 10 is a flowchart showing a processing example in a case of the pattern 2 (or 3) of the fourth method in skip determination by information on an encoding mode described above, as a sixth embodiment. In this embodiment, a skip range of filter process is set to be a loop in units of pictures (or slices) (step S81). Next, it is determined whether or not the processing is under a high-loaded condition (step S82), and when the processing is under a high-loaded condition, a constant (which is a fixed value, or is set based on an extent of a loaded condition), or a value in which a constant is added to an average value of ratios of B slices in past (decoded) pictures (or slices) is set as a threshold value (step S83), and it is determined whether or not a ratio of B slices in a picture (or a slice) serving as a decoding object is larger than a threshold value (step S84). When a ratio of B slices is larger than the threshold value, processing is skipped deblocking filter process of the picture (or the slice) serving as a decoding object (step S85), and the routine proceeds to skip determination for the following picture (or slice) unit. When it is determined that a ratio of B slices is not larger than the threshold value at step S84, the processing at step S85 is passed. Further, when it is determined that the processing is not under a high-loaded condition at the step S82, processing is carried out such that deblocking filter process is executed onto the picture (or the slice) serving as a decoding object.

Seventh Embodiment

Figure 11:
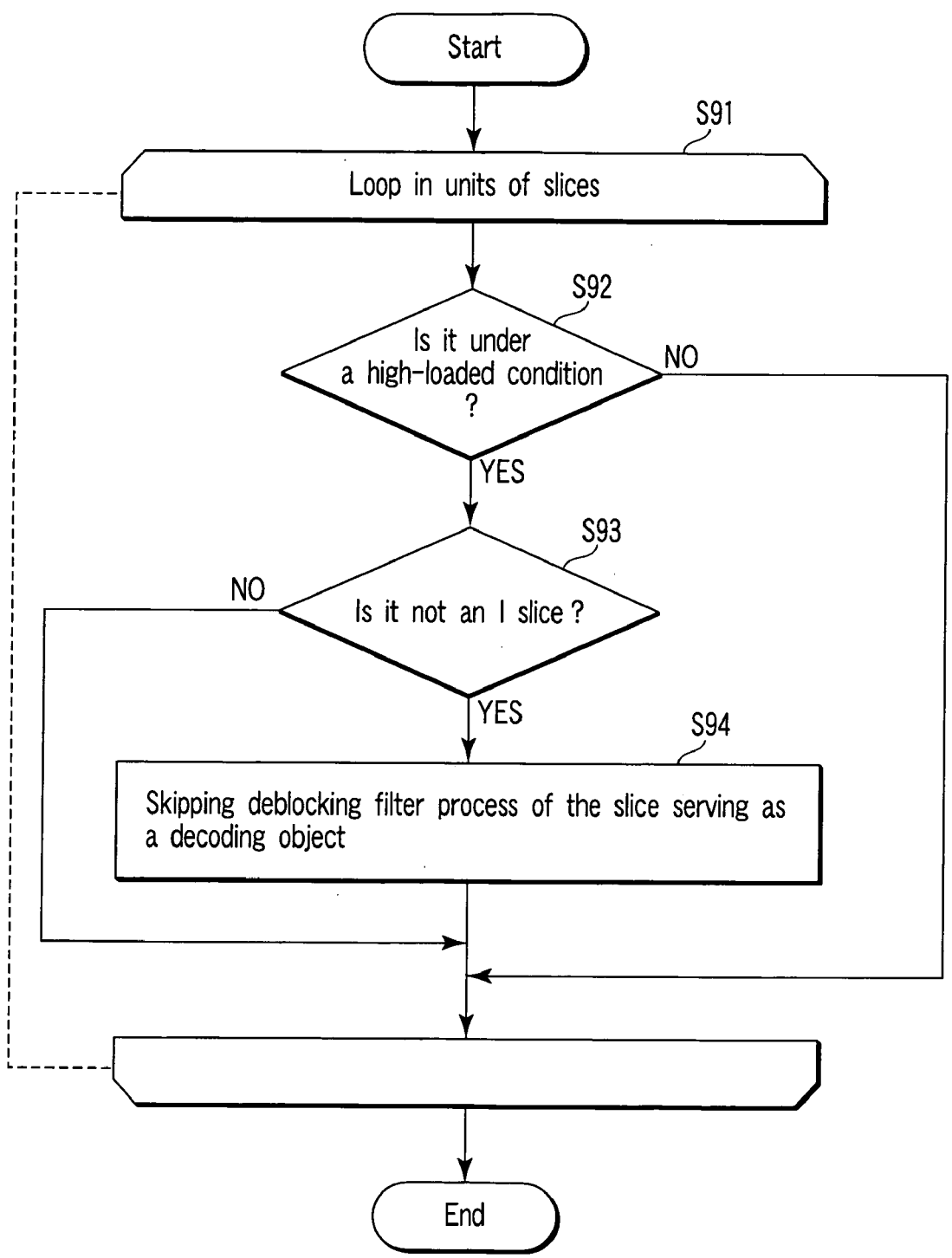
FIG. 11 is a flowchart showing a processing example in a case according to pattern 1 of a first method in skip determination by information on an encoding mode, as a seventh embodiment of the skip determining method of the deblocking filter skip determining unit in FIG. 1.

FIG. 11 is a flowchart showing a processing example in a case of the pattern 1 of the first method in skip determination by information on an encoding mode described above, as a seventh embodiment. In this embodiment, a skip range of filter process is set to be a loop in units of slices (step S91). Next, it is determined whether or not the processing is under a high-loaded condition (step S92), and when the processing is under a high-loaded condition, it is determined whether or nor an decoding object is an I slice (step S93). When it is determined that the decoding object is not an I slice, processing is skipped deblocking filter process of the slice serving as a decoding object (step S94), and the routine proceeds to skip determination for the following slice unit. When it is determined that the decoding object is an I slice at step S93, the processing at step S94 is passed. Further, when it is determined that the processing is not under a high-loaded condition at the step S92, processing is carried out such that deblocking filter process is executed onto the slice serving as a decoding object.

Eighth Embodiment

Figure 12:
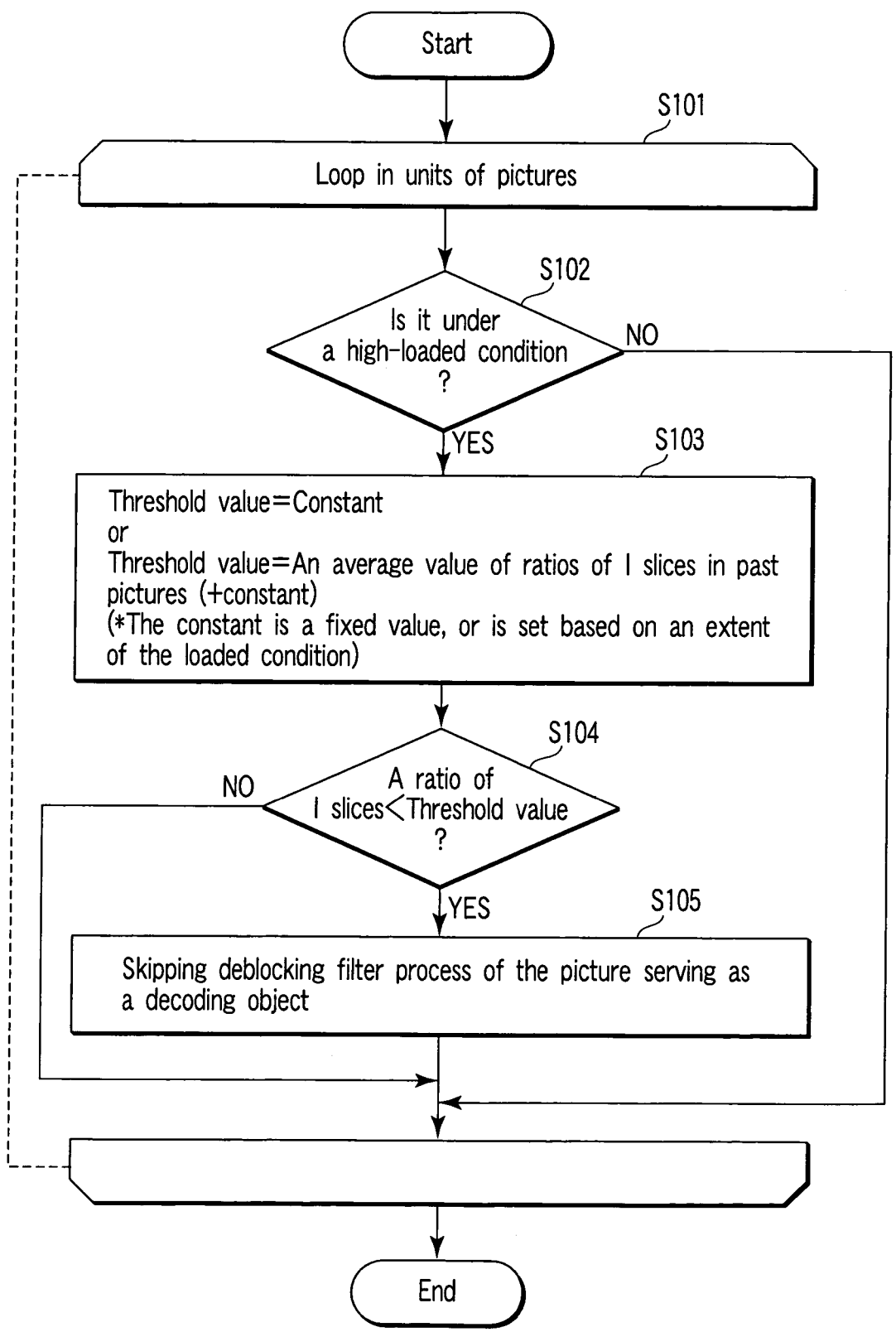
FIG. 12 is a flowchart showing a processing example in a case according to pattern 2 of the first method in skip determination by information on an encoding mode, as an eighth embodiment of the skip determining method of the deblocking filter skip determining unit in FIG. 1.

FIG. 12 is a flowchart showing a processing example in a case of the pattern 2 of the first method in skip determination by information on an encoding mode described above, as an eighth embodiment. In this embodiment, a skip range of filter process is set to be a loop in units of pictures (step S101). Next, it is determined whether or not the processing is under a high-loaded condition (step S102), and when the processing is under a high-loaded condition, a constant (which is a fixed value, or is set based on an extent of a loaded condition), or a value in which a constant is added to an average value of ratios of I slices in past (decoded) pictures is set as a threshold value (step S103), and it is determined whether or not a ratio of I slices in a picture serving as a decoding object is less than the threshold value (step S104). When a ratio of I slices is less than the threshold value, processing is skipped deblocking filter process of the picture serving as a decoding object (step S105), and the routine proceeds to skip determination for the following picture unit. When it is determined that a ratio of I slices is not less than the threshold value at step S104, the processing at step S105 is passed. Further, when it is determined that the processing is not under a high-loaded condition at the step S102, processing is carried out such that deblocking filter process is executed onto the picture serving as a decoding object.

Ninth Embodiment

Figure 13:
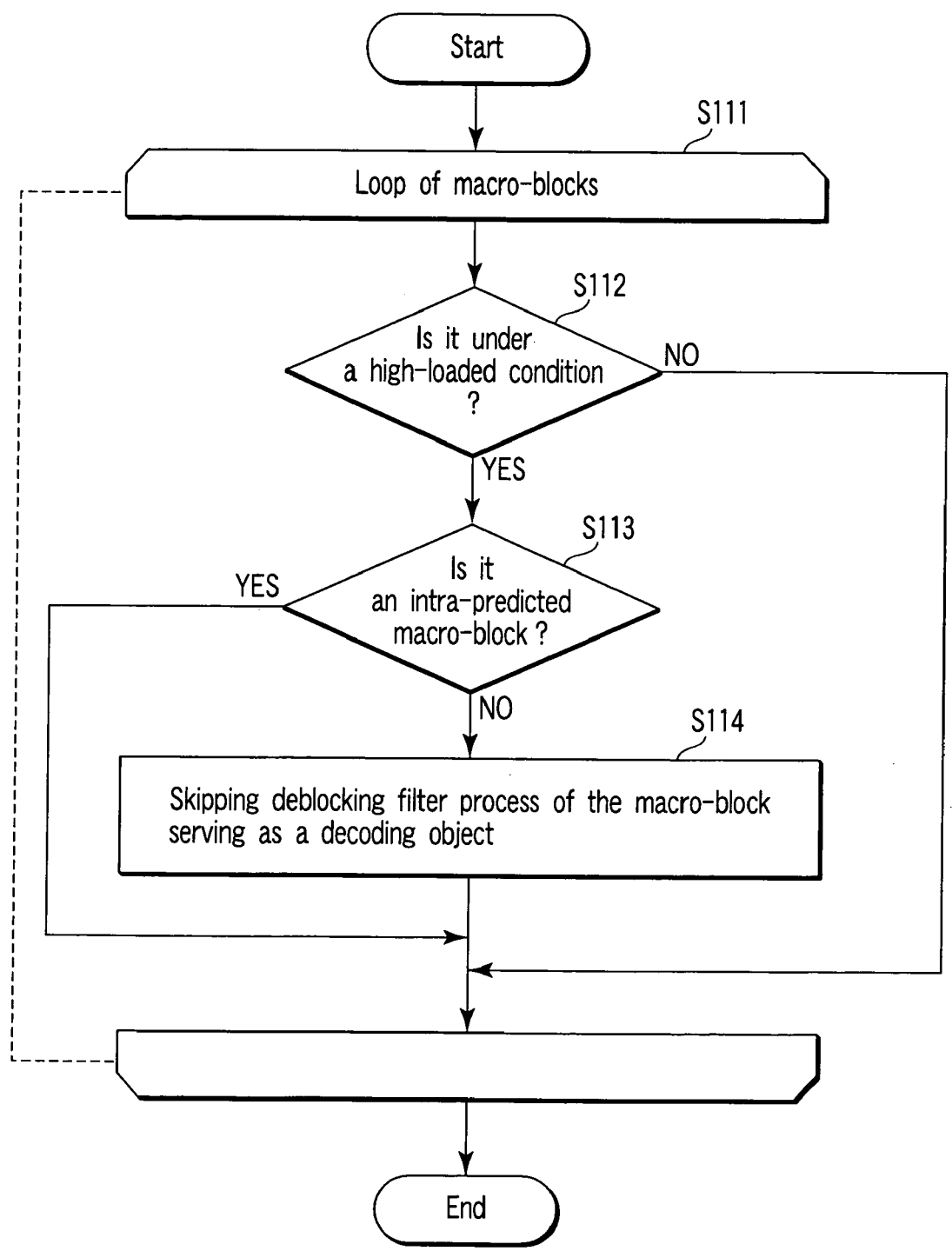
FIG. 13 is a flowchart showing a processing example in a case according to pattern 1 of a second method in skip determination by information on an encoding mode, as a ninth embodiment of the skip determining method of the deblocking filter skip determining unit in FIG. 1.

FIG. 13 is a flowchart showing a processing example in a case of the pattern 1 of the second method in skip determination by information on an encoding mode described above, as a ninth embodiment. In this embodiment, a skip range of filter process is set to be a loop in units of macro-blocks (step S111). Next, it is determined whether or not the processing is under a high-loaded condition (step S112), and when the processing is under a high-loaded condition, it is determined whether or not a decoding object is an intra-predicted macro-block (step S113). When it is determined that the decoding object is not an intra-predicted macro-block, processing is skipped deblocking filter process of the macro-block serving as a decoding object (step S114), and the routine proceeds to skip determination for the following macro-block unit. When it is determined that the decoding object is an intra-predicted macro-block at step S113, the processing at step S114 is passed. Further, when it is determined that the processing is not under a high-loaded condition at the step S112, processing is carried out such that deblocking filter process is executed onto the macro-block serving as a decoding object.

Tenth Embodiment

Figure 14:
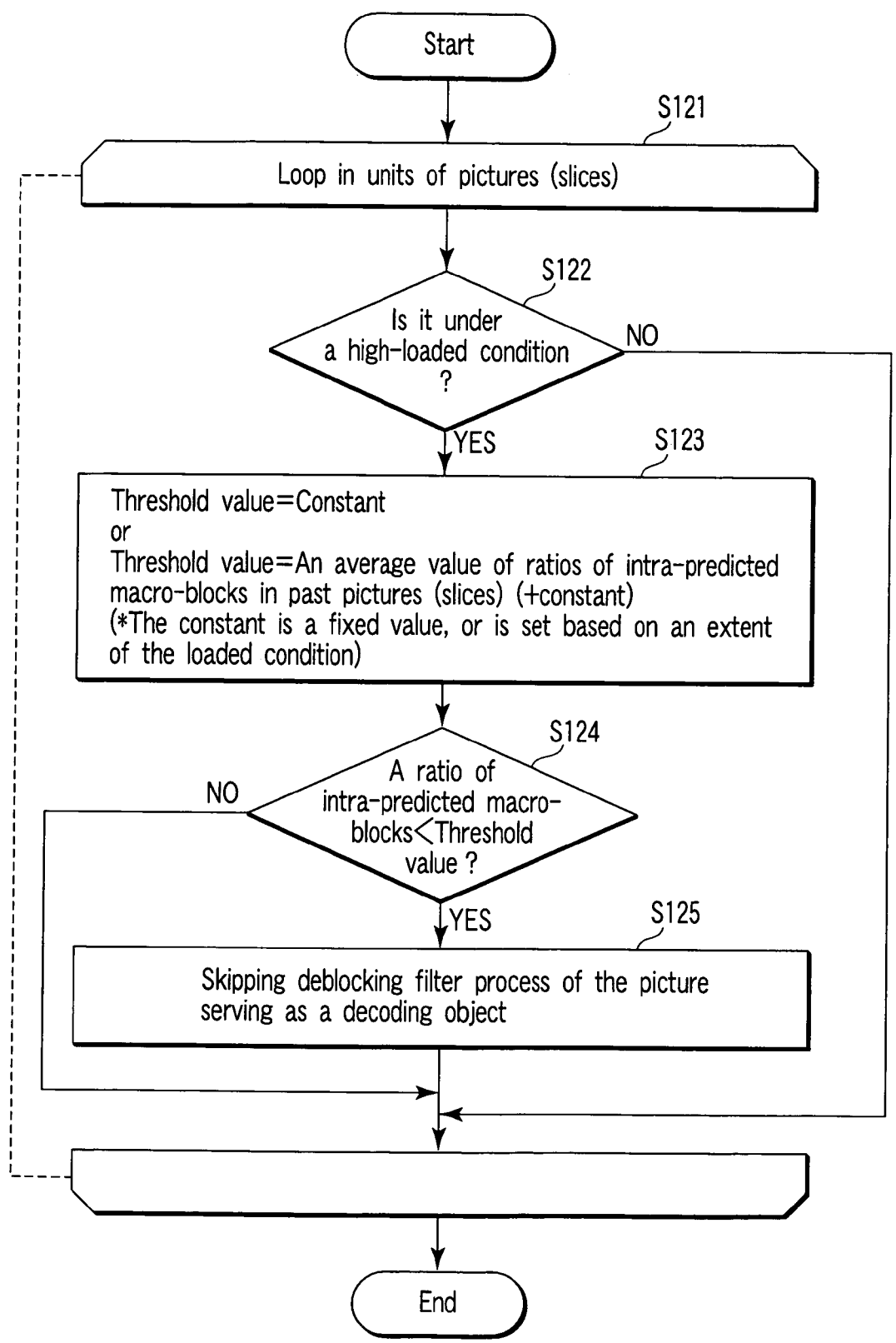
FIG. 14 is a flowchart showing a processing example in a case according to pattern 3 (or 2) of the second method in skip determination by information on an encoding mode, as a tenth embodiment of the skip determining method of the deblocking filter skip determining unit in FIG. 1.

FIG. 14 is a flowchart showing a processing example in a case of the pattern 3 (or 2) of the second method in skip determination by information on an encoding mode described above, as a tenth embodiment. In this embodiment, a skip range of filter process is set to be a loop in units of pictures (or slices) (step S121). Next, it is determined whether or not the processing is under a high-loaded condition (step S122), and when the processing is under a high-loaded condition, a constant (which is a fixed value, or is set based on an extent of a loaded condition), or a value in which a constant is added to an average value of ratios of intra-predicted macro-blocks in past (decoded) pictures (or slices) is set as a threshold value (step S123), and it is determined whether or not a ratio of intra-predicted macro-blocks in a picture (or a slice) serving as a decoding object is less than the threshold value (step S124). When a ratio of intra-predicted macro-blocks is less than the threshold value, processing is skipped deblocking filter process of the picture (or the slice) serving as a decoding object (step S125), and the routine proceeds to skip determination for the following picture (or slice) unit. When it is determined that a ratio of intra-predicted macro-blocks is not less than the threshold value at step S124, the processing at step S125 is passed. Further, when it is determined that the processing is not under a high-loaded condition at the step S122, processing is carried out such that deblocking filter process is executed onto the picture (or the slice) serving as a decoding object.

The first to tenth embodiments have been described above. However, the other patterns described above as well can be executed in the same way. Further, more efficient skip can be executed by combining individual patterns of skip determination by information respectively on a quantization parameter and an encoding mode.

Note that the present invention can be achieved as, not only a video decoding apparatus as described above, but also a video decoding method having characteristic steps which are included in such a video decoding method. Further, those steps can be realized as a program to be executed by a computer. Then, such a program can be distributed via recording media such as CD-ROMs and the like, and a transmission medium such as the Internet and the like.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video decoding apparatus decoding a video stream which has been compressed and encoded, comprising:
   a prediction decoding unit which selectively generates one of an intra prediction image and an inter prediction image based on an encoding mode of a decoding object from the video stream and decoded images thereof;
   a residual decoding unit which generates a residual decoded image based on a quantization parameter of a decoding object from the video stream;
   an adding unit which generates a decoded image by adding an intra prediction image and an inter prediction image selectively generated by the prediction decoding unit, and a residual decoded image generated by the residual decoding unit;
   a filter process unit which applies deblocking filter process for reducing a block distortion onto a decoded image generated by the adding unit;
   a determining unit which determines whether or not a current processing load is high and which, if it is determined that the current processing load is high, extracts at least one of information on a quantization parameter and information on an encoding mode of a decoding object from the video stream, and which determines whether or not the filter process is skipped, based on extracted information thereof; and
   a skip processing unit which selectively omits the filter process based on a determined result of the determining unit
   wherein the determining unit specifies a central value of quantization parameters of the decoding object to be compared with a threshold value serving as a reference for determination, and carries out the skip determination based on a comparison result thereof, and
   as the threshold value serving as a reference of determination, an average value of the central values of quantization parameters in decoded past pictures or slices, or a value in which an offset value is added to the average value is used.

2. The video decoding apparatus according to claim 1, wherein the determining unit carries out determination in units of slices, in units of macro-blocks, in units of an arbitrary number of macro-blocks, or in units of pictures of the decoded image.

3. The video decoding apparatus according to claim 1, wherein, as the central value of quantization parameters of the decoding object, an average value of quantization parameters of slices, or quantization parameters of macro-blocks belonging to slices, an average value of quantization parameters of macro-blocks, or quantization parameters of an arbitrary number of macro-blocks, an average value of quantization parameters of slices belonging to a picture, or an average value of quantization parameters of macro-blocks belonging to a picture is used.

4. The video decoding apparatus according to claim 1, wherein the determining unit determines that the filter process is not skipped when the information on an encoding mode of the decoding object is at least a slice in a reference picture by only prediction-in-screen.

5. The video decoding apparatus according to claim 1, wherein the determining unit determines that the filter process is not skipped when the information on an encoding mode of the decoding object is at least a predicted macro-block in-screen.

6. The video decoding apparatus according to claim 1, wherein the determining unit determines that the filter process is skipped when the information on an encoding mode of the decoding object is at least a slice in a non-reference picture.

7. The video decoding apparatus according to claim 1, wherein the determining unit determines that the filter process is skipped when the information on an encoding mode of the decoding object is at least a bi-directional predicted macro-block (a bi-directional, predicted macro-block in-screen).

8. A video decoding method for decoding a video stream which has been compressed and encoded, comprising:
   selectively generating one of an intra prediction image and an inter prediction image based on an encoding mode of a decoding object from the video stream and decoded images thereof;
   generating a residual decoded image based on a quantization parameter of a decoding object from the video stream;
   generating a decoded image by adding an intra prediction image and an inter prediction image selectively generated, and the residual decoded image;
   applying deblocking filter process for reducing a block distortion onto the decoded image;
   determining whether or not a current processing load is high;
   if it is determined that the current processing load is high, extracting at least one of information on a quantization parameter and information on an encoding mode of a decoding object from the video stream, and determining whether or not the filter process is skipped based on extracted information thereof; and selectively skipping the filter process based on a result of the determination, wherein the skip determination specifies a central value of quantization parameters of the decoding object to be compared with a threshold value serving as a reference for determination, and carries out the skip determination based on a comparison result thereof, and as the threshold value serving as a reference for determination, an average value of the central values of quantization parameters in decoded past pictures or slices, or a value in which an offset value is added to the average value is used.

9. The video decoding method according to claim 8, wherein the skip determination carries out determination in units of slices, in units of macro-blocks, in units of an arbitrary number of macro-blocks, or in units of pictures of the decoded image.

10. The video decoding method according to claim 8, wherein, as the central value of quantization parameters of the decoding object, an average value of quantization parameters of slices, or quantization parameters of macro-blocks belonging to slices, an average value of quantization parameters of macro-blocks, or quantization parameters of an arbitrary number of macro-blocks, an average value of quantization parameters of slices belonging to a picture, or an average value of quantization parameters of macro-blocks belonging to a picture is used.

11. The video decoding method according to claim 8, wherein the skip determination determines that the filter process is not skipped when the information on an encoding mode of the decoding object is at least a slice in a reference picture by only prediction-in-screen.

12. The video decoding method according to claim 8, wherein the skip determination determines that the filter process is not skipped when the information on an encoding mode of the decoding object is at least a predicted macro-block in-screen.

13. The video decoding method according to claim 8, wherein the skip determination determines that the filter process is skipped when the information on an encoding mode of the decoding object is at least a slice in a non-reference picture.

14. The video decoding method according to claim 8, wherein the skip determination determines that the filter process is skipped when the information on an encoding mode of the decoding object is at least a bi-directional predicted macro-block (a bi-directional predicted macro-block in-screen).

* * * * *